April 9, 1963  H. W. THIELFOLDT  3,084,395
METHOD OF BLOW MOLDING HOLLOW ARTICLES
Filed April 13, 1960  2 Sheets-Sheet 1
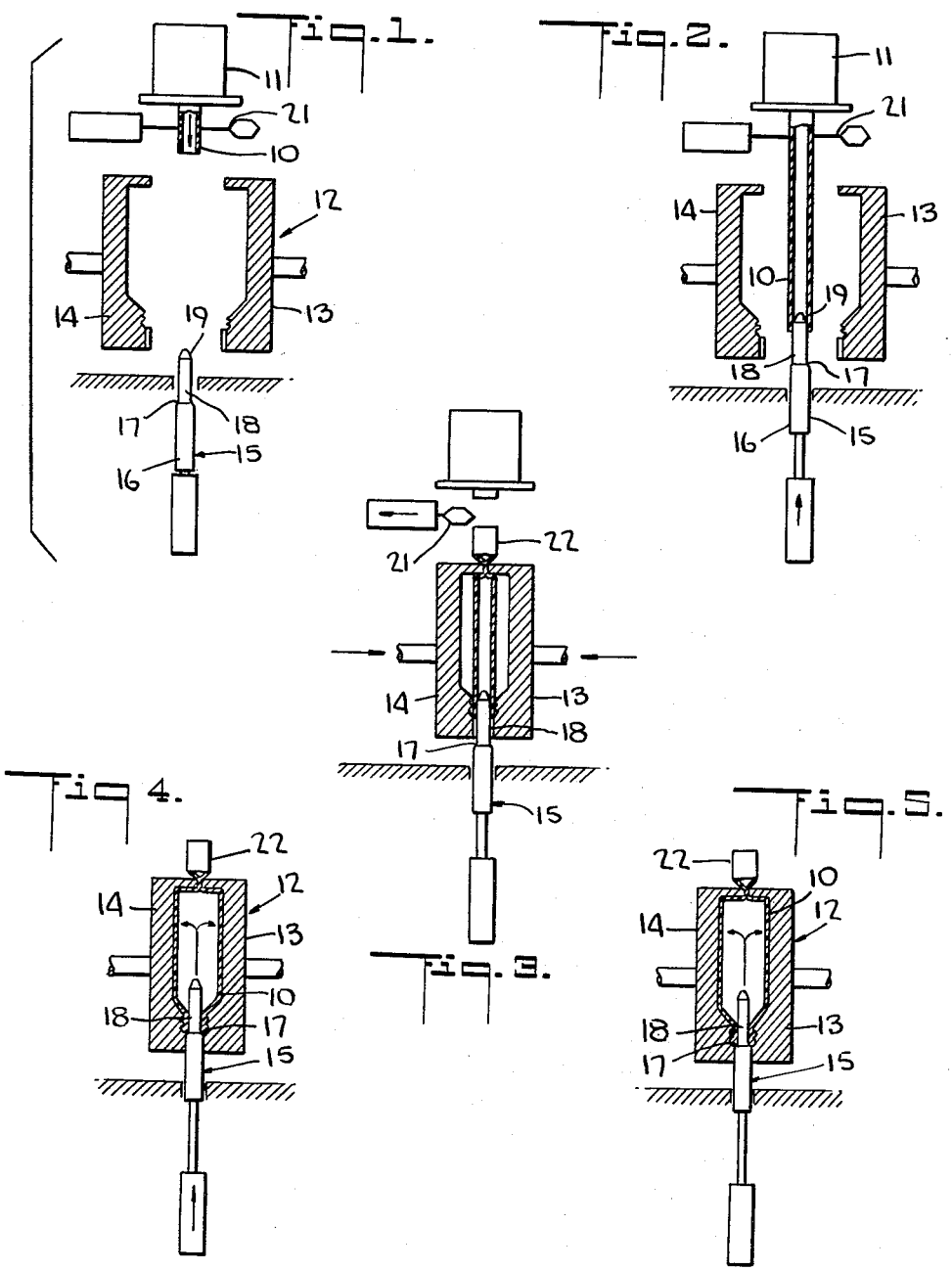
INVENTOR.
HENRY W. THIELFOLDT
BY March, Gillette, Virgil & Eslinger
ATTORNEYS April 9, 1963     H. W. THIELFOLDT     3,084,395
METHOD OF BLOW MOLDING HOLLOW ARTICLES
Filed April 13, 1960
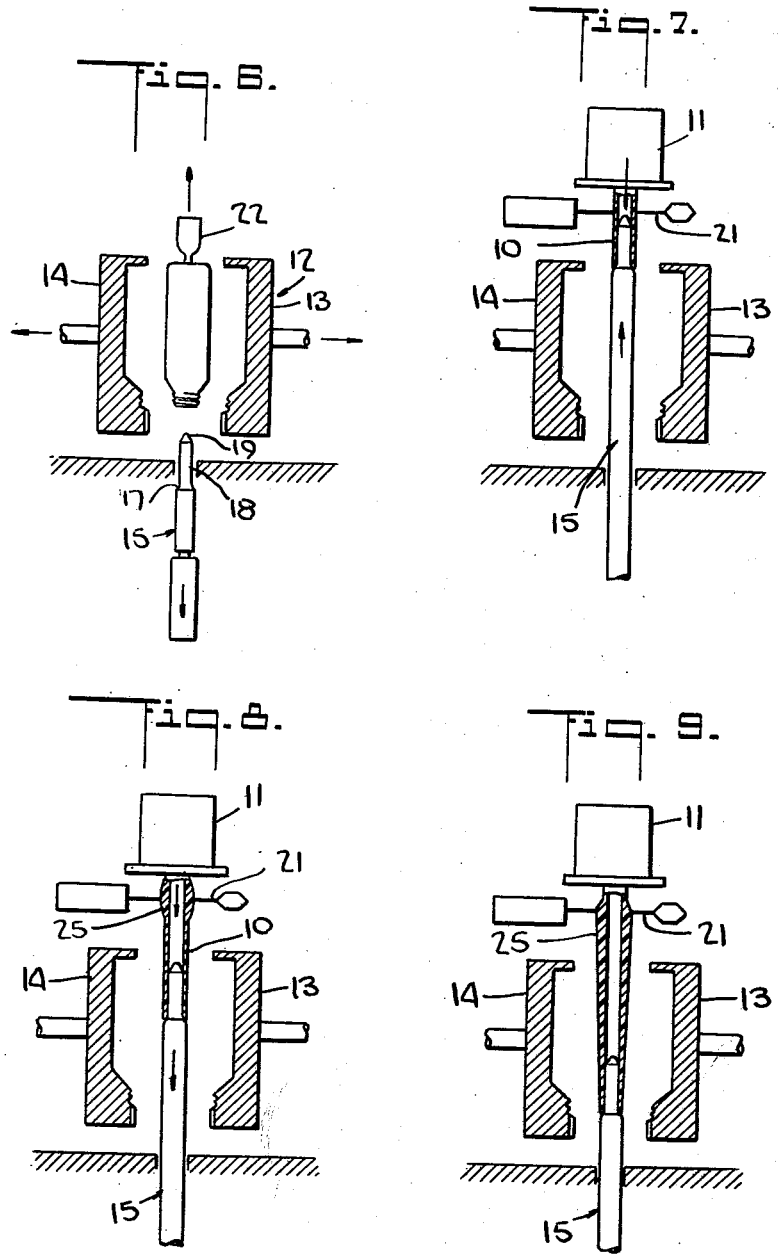

3,084,395
METHOD OF BLOW MOLDING HOLLOW ARTICLES
Henry W. Thielfoldt, Huntington Station, N.Y., assignor, by mesne assignments, to Owens-Illinois Glass Company, Toledo, Ohio, a corporation of Ohio
Filed Apr. 13, 1960, Ser. No. 21,983
2 Claims. (Cl. 18—55)

This invention relates to method of producing blown articles of heat deformable material, and more particularly it pertains to method of manufacturing blown bottles of thermoplastic polymeric material.

Bottles of thermoplastic polymeric material such as polyethylene can be manufactured by forming tubular shaped members of the material by extrusion and passing the same into an open mold consisting of two separable sections. The extrudate is placed in vertical alignment with a mandrel having a diameter slightly less than that of the extrudate, which in turn is passed upwardly for engagement therewith so that the extrudate is mounted on the mandrel. When the extrudate is mounted on the mandrel, the mold is closed about them. The mandrel contains an opening through which gaseous material such as air can be charged to blow or force the extrudate against the sides of the mold to give the desired shape of the finished article.

Two significant disadvantages are present in the above method. In the first place the neck of the bottle is only roughly finished, because during the blowing or molding phase of the operation some polymer is forced outwardly from between the mandrel and the mold. Secondly the distribution of polymer in the extrudate is not adequate to produce a bottle having substantially uniform wall thickness. For some applications, the lack of uniformity in mold thickness may not be serious, but if the bottle is to be used under pressure, then the wall thickness of the extrudate should be enough to produce a bottle having a minimum wall thickness to withstand the pressure of use. To attain this objective results in uneconomical use of polymeric material. The present invention overcomes the above disadvantages.

Thus an object of this invention is to provide a method for producing an article of heat deformable material which is in a substantially finished state at the end of the molding operation.

Still another object of this invention is to provide a method of producing a blown article of heat deformable material having substantially uniform wall thickness.

A further object is to provide method of producing blown articles of polyethylene which are in a substantially finished state at the end of the molding operation and which have substantially uniform wall thickness.

For a fuller understanding reference will be had to the accompanying drawings which form a part of this specification and wherein:

FIGURES 1–6 inclusive represent a series of stages of the molding operation which illustrate the method and means by which a blown article in a substantially finished state can be obtained; and FIGURES 7–9 inclusive represent the stages illustrating how the molding operation can be controlled to provide a blown article of substantially uniform wall thickness.

In the molding operation of the present invention, a heat deformable material is blown within a mold to produce an article of a desired shape. The heat deformable material can be any material whether natural or synthetic in origin, such as thermoplastic polymeric materials, e.g., polyethylene, just so long as it is deformable when heated to an elevated temperature. This permits the molding step to be achieved by the use of a gaseous material under pressure. The gaseous material for the purpose of this invention can be any material which is normally liquid or gas under ambient conditions, and which is gaseous or vaporous under the conditions of molding. Air, nitrogen, argon or any other similar gaseous material can be used, and other useful materials would be readily suggested to those skilled in the art.

In the drawings, deformable or moldable polyethylene is extruded in the form of a tubular member 10 from a conventional extruder head 11, and passes downwardly in alignment with the center line of an open mold 12 consisting of two separated sections 13 and 14. The extruder and its parts and the mold are conventional equipment which can be readily understood by any person skilled in the art. As the tubular member, or the extrudate, 10 passes downwardly, a mandrel or blow pin 15 is moving upwardly simultaneously, both elements being in vertical or axial alignment with each other. The mandrel 15 consists of a circular base 16, a circular top 18 of reduced cross-section, a shoulder 17 intermediate of the two having the configuration which is desired for the top of the neck of the blown article and a pointed end 19. The mandrel 15 contains a longitudinal opening or bore (not shown) from which air or gaseous material is discharged during the molding operation.

In FIGURE 2, the mandrel 15 has reached the half way point of its upward travel and comes to rest, and in the meantime the extrudate 10 continues to pass downwardly until it engages the mandrel and slides over the same. The top 18 of the mandrel is slightly less in diameter than the internal diameter of the extrudate 10 so that the two may engage, i.e., one within the other. As soon as the extrudate 10 begins to mount the mandrel 15, air may be fed into the extrudate through the bore (not shown) of the mandrel to prevent the extrudate 10 from collapsing.

At the end of the stage represented by FIGURE 2, the extrudate 10 is severed from the main supply by means of knife 21 and the mold sections 13 and 14 close about the extrudate 10 and the top 18 of the mandrel 15. After this has happened, the mold, mandrel and extrudate move as an assembly unit to a new position shown in FIGURE 3. By virtue of the mold sections 13 and 14 being closed the part of the polyethylene caught between the mating surfaces of the mold sections 13 and 14 is reduced substantially in size and the upper part 22 is retained and serves later as means for lifting the finished article from the mold 12. In the stage represented by FIGURE 3, air or other gaseous material is fed through the bore (not shown) of the mandrel 15 to blow mold the extrudate to an article conforming to the shape of the inside configuration of the mold 12, which in this example is a bottle. As the blowing is taking place, the entire assembly moves to another position or stage in the operation as shown in FIGURE 4.

During the stage represented by FIGURE 4, the extrudate is still being blown, but also in the meantime, the mandrel 15 moves to its uppermost position of travel. At this highest position the shoulder 17 engages the edge of the neck of the bottle being molded and serves as the wall of the mold in forming a smooth and desirable contour for the molding operation. The shoulder also prevents polyethylene from flowing out between the base 16 and the mold 12. The blowing is continued during the next stage shown as FIGURE 5, and is regulated by means of a cycle timer. The last stage of the operation is shown in FIGURE 6, where the mold sections 13 and 14 open, blowing is discontinued, the mandrel is withdrawn and the bottle is removed.

The means by which the mold is opened and closed, the air is supplied for blowing, the mandrel is raised and lowered and the extrudate is cut and all other operations described above involve conventional equipment which may be operated manually or automatically. For example, the mold assembly may be mounted on a turret (not shown) and the sequence of stages timed with respect to the travel of the same on the turret. The turret may contain several mold assemblies so that a continuous operation can be achieved. Accordingly, any skilled person in this art would readily appreciate what type of equipment is involved. For the purpose of supplementing the present description, the disclosures of Patent Numbers 2,810,934 and 2,898,633 are hereby incorporated by reference. With respect to the extrudate, it leaves the extruder at a temperature of about 220 to 400° F.

In the drawings shown as FIGURES 7-9 inclusive, the operation previously described is modified to produce an extrudate which has greater wall thickness at the upper part than the lower part thereof. Consequently, the polyethylene is concentrated in the region of the extrudate which must undergo the greatest amount of stretch during the molding or blowing operation. After the extrudate has been formed, in accordance with the modified procedure shown in FIGURES 7-9, the next stages of the operation are the same as those described hereinabove in connection with FIGURES 1-6 inclusive.

In the first stage shown as FIGURE 7, the mandrel 15 is raised so that it meets the extrudate 10 as it is being extruded from the extruder header 11. To accomplish this objective, the mandrel rises appreciably more than it did in the operation shown in FIGURES 1-6 inclusive. Thereafter, the extrudate 10 and the mandrel are permitted to pass downwardly at variable speeds so that, as shown in FIGURE 8, the upper part 25 of the extrudate 10 begins to thicken. This is effected by having the mandrel travel downwardly at a slower rate than the extrudate. As the extrudate 10 and mandrel 15 continue to move downwardly at variable speeds, the extrudate 10 develops a wall of tapered thickness as shown in FIGURE 9. The choice of relative speeds of mandrel and extrudate depends upon the state of plasticity of the extrudate 10. If the mandrel 15 is lowered faster than the extrudate, it would result in stretching rather than thickening of the walls of the extrudate.

On the other hand, if the mandrel 15 is lowered at too slow a rate, the thickness of the wall of the extrudate becomes too great and hence leads to an uneconomical result. While the mandrel is shown as having a shoulder, it is possible to operate the system of FIGURES 6-9 inclusive without the same. The auxiliary equipment described in connection with FIGURES 1-6 inclusive may also be used for the system of FIGURES 6-9 inclusive. The extrudate leaves the extruder at a temperature of about 220 to 400° F.

I claim:
1. A process which comprises passing a mandrel upwardly into an open mold having a lower section thereof in the shape of a bottle neck, the mandrel comprising an upper part of reduced cross-section relative to a lower part which is separated therefrom by an annular shoulder having the desired configuration of the end of the bottle neck, the mandrel coming to rest when its upper end projects above the mold, passing downwardly a cylindrically shaped deformable material so that the lower part thereof is slidably mounted partially on the upper part of the mandrel, the mandrel and deformable material thus engaged are passed downwardly at different rates so that a greater wall thickness is obtained at the upper part of the deformable material than the lower part by the time that the overlapping portion of mandrel and deformable material are horizontally adjacent to the lower section of the mold and the shoulder of the mandrel is below the same, closing the mold and thereby causing the overlapping portion of the mandrel and deformable material to be circumscribed by the lower section of the mold, forcing the mandrel upwardly into the mold until the shoulder thereof abuts the lower end of the deformable material and a substantial part of the lower part of the mandrel mates with the surface of the mold, and blowing the deformable material until it conforms with the shape of the mold and thereby obtaining a bottle with a finished neck.

2. The process of claim 1 wherein the mandrel is moved relative to the movement of the hollow section of deformable material so that the former interferes with the downward movement of the hollow section sufficiently to cause greater thickening of the upper wall of the hollow section of deformable material than the wall of the lower part thereof.

References Cited in the file of this patent
UNITED STATES PATENTS

| 2,632,202 | Haines | Mar. 24, 1953 |
| 2,657,431 | Slaughter | Nov. 3, 1953 |
| 2,787,023 | Hagen et al. | Apr. 2, 1957 |
| 2,810,934 | Bailey | Oct. 29, 1957 |
| 2,928,120 | Leghorn et al. | Mar. 15, 1960 |
| 2,930,079 | Parfrey | Mar. 29, 1960 |
| 2,943,349 | Adams et al. | July 5, 1960 |
| 3,009,196 | Hagen | Nov. 21, 1962 |

FOREIGN PATENTS

| 744,927 | Great Britain | Feb. 15, 1956 |
| 1,029,586 | France | June 3, 1953 |
| 1,218,041 | France | Dec. 14, 1959 |